US011260318B2

(12) United States Patent
Nieuwoudt

(10) Patent No.: US 11,260,318 B2
(45) Date of Patent: Mar. 1, 2022

(54) MASS TRANSFER ASSEMBLY AND COLUMN WITH DIVIDING WALL AND METHODS INVOLVING SAME

(71) Applicant: Koch-Glitsch, LP, Wichita, KS (US)

(72) Inventor: Izak Nieuwoudt, Wichita, KS (US)

(73) Assignee: Koch-Glitsch, LP, Wichita, KS (US)

( * ) Notice: Subject to any disclaimer, the term of this patent is extended or adjusted under 35 U.S.C. 154(b) by 0 days.

(21) Appl. No.: 16/761,082

(22) PCT Filed: Nov. 14, 2018

(86) PCT No.: PCT/IB2018/058938
§ 371 (c)(1),
(2) Date: May 1, 2020

(87) PCT Pub. No.: WO2019/097409
PCT Pub. Date: May 23, 2019

(65) Prior Publication Data
US 2021/0178283 A1   Jun. 17, 2021

Related U.S. Application Data

(60) Provisional application No. 62/585,873, filed on Nov. 14, 2017.

(51) Int. Cl.
*B01D 3/14* (2006.01)
*B01D 3/42* (2006.01)
(Continued)

(52) U.S. Cl.
CPC ............ *B01D 3/141* (2013.01); *B01D 3/008* (2013.01); *B01D 3/324* (2013.01); *B01D 3/42* (2013.01); *B01D 3/4211* (2013.01)

(58) Field of Classification Search
CPC .......... B01D 3/141; B01D 3/163; B01D 3/32; B01D 3/324; B01D 3/008; B01D 3/14;
(Continued)

(56) References Cited

U.S. PATENT DOCUMENTS

| 2,582,523 A | * | 1/1952 | Beglinger | ............ B01D 3/008 137/262 |
| 4,167,475 A | * | 9/1979 | Winter, III | ............ B01D 3/14 196/132 |

(Continued)

FOREIGN PATENT DOCUMENTS

| CN | 104334244 A | 2/2015 |
| CN | 205216245 U | 5/2016 |

(Continued)

OTHER PUBLICATIONS

International Search Report and Written Opinion received for PCT patent application No. PCT/IB2018/058938, dated Jan. 22, 2019, 9 pages.
(Continued)

*Primary Examiner* — Jonathan Luke Pilcher

(57) ABSTRACT

A mass transfer column comprising: a shell (12); an open internal region (14) defined by said shell; and a mass transfer assembly (16) positioned in the open internal region (14), the mass transfer assembly (16) comprising: a dividing wall (18) forming first and second sub-regions; one or more zones of mass transfer structures positioned in the first and second sub-regions (22 and 24); and a liquid flow divider (48) positioned above the dividing wall (18) for delivering a volumetric split of liquid to the first and second sub-regions. The liquid flow divider (48) may comprise a moveable weir (68) or a valve (180) in order the change the ratio of liquid flow between the two sub-regions.

20 Claims, 9 Drawing Sheets

(51) Int. Cl.
    *B01D 3/00*    (2006.01)
    *B01D 3/32*    (2006.01)
(58) Field of Classification Search
    CPC .......... B01D 3/30; B01D 3/42; B01D 3/4205;
                                              B01D 3/4211
    See application file for complete search history.

(56) References Cited

U.S. PATENT DOCUMENTS

| | | | | |
|---|---|---|---|---|
| 8,052,845 | B2 * | 11/2011 | Zuber | .................. B01D 3/4261 |
| | | | | 202/158 |
| 2008/0251127 | A1 * | 10/2008 | Zuber | .................. B01D 3/4261 |
| | | | | 137/1 |
| 2010/0096249 | A1 | 4/2010 | Kovak | |
| 2015/0119612 | A1 * | 4/2015 | Agrawal | ................ B01D 3/141 |
| | | | | 585/16 |
| 2016/0263492 | A1 * | 9/2016 | Gao | ....................... B01D 3/141 |

FOREIGN PATENT DOCUMENTS

| | | | |
|---|---|---|---|
| CN | 205549653 | U | 9/2016 |
| CN | 106669214 | A | 5/2017 |
| EP | 2233183 | A1 | 9/2010 |
| EP | 2829308 | A1 | 1/2015 |
| EP | 3061507 | A1 | 8/2016 |

OTHER PUBLICATIONS

First Office Action and Search Report received for CN application No. 201880073621.9, dated Jul. 27, 2021, 22 pages. (12 pages of English translation and 10 pages of Official copy).

* cited by examiner

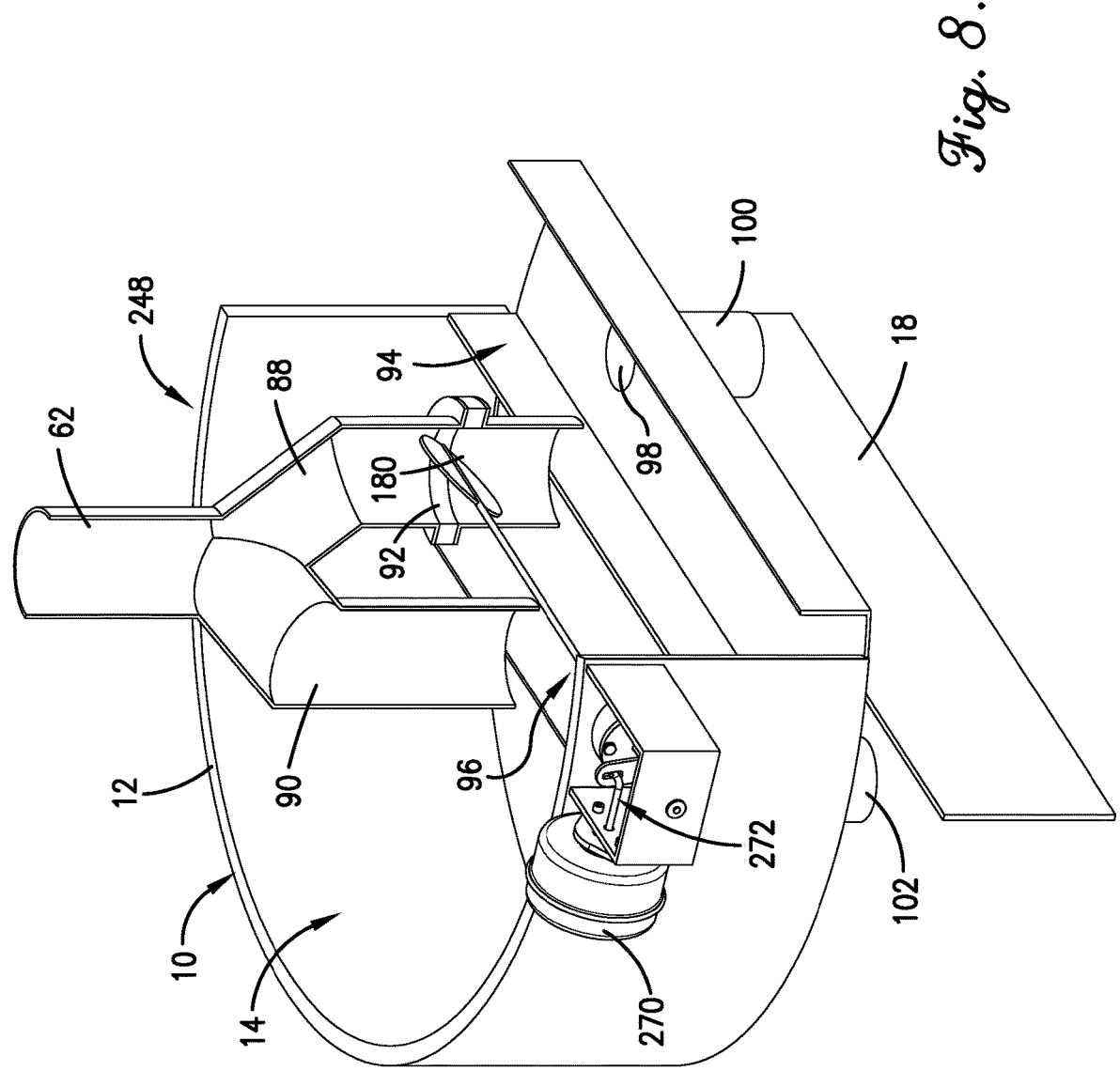

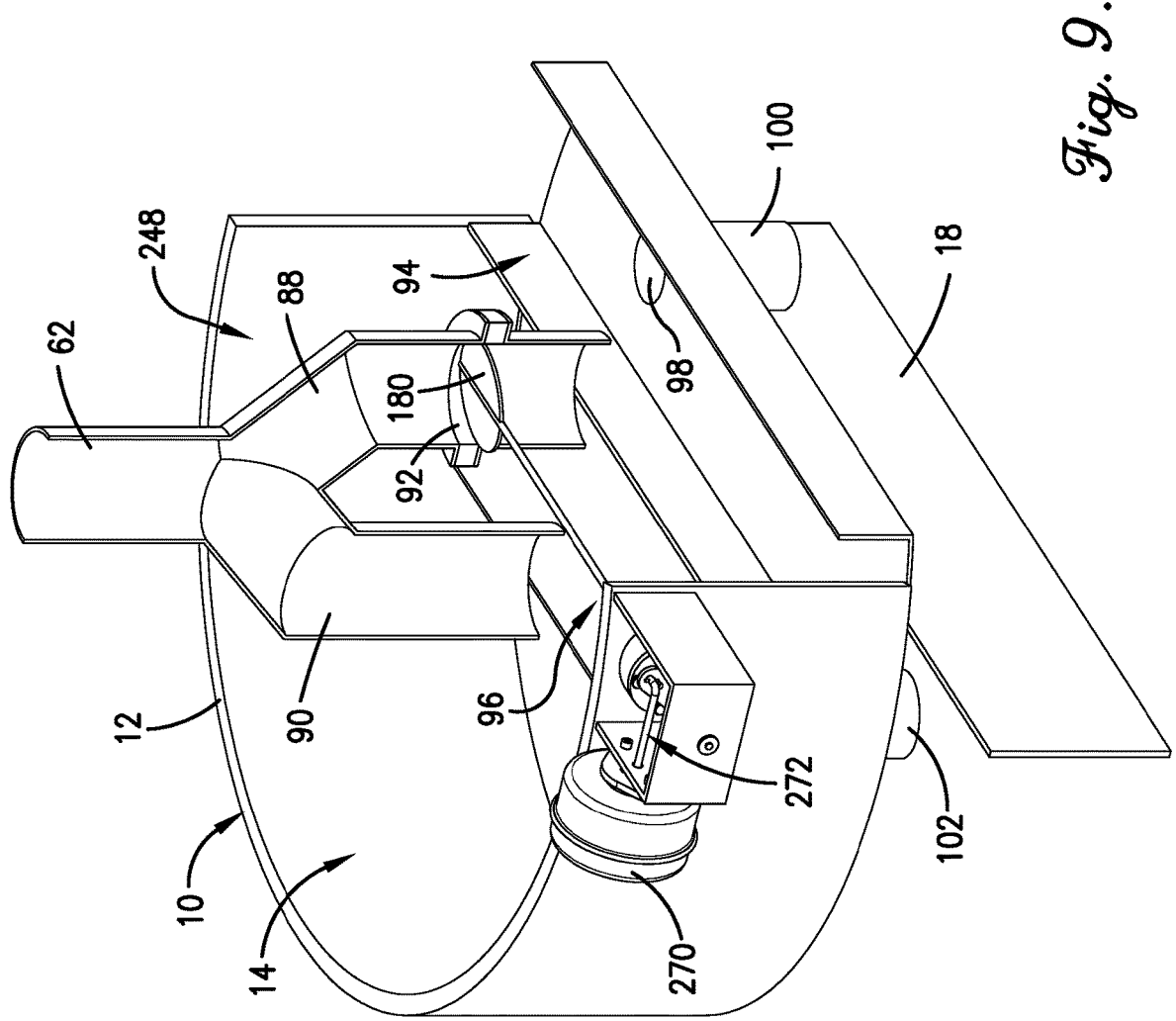

MASS TRANSFER ASSEMBLY AND COLUMN WITH DIVIDING WALL AND METHODS INVOLVING SAME

CROSS-REFERENCE TO RELATED APPLICATIONS

This application is a filing under 35 U.S.C. 371 as the National Phase of International Patent Application No. PCT/IB2018/058938, filed on Nov. 14, 2018, which claims the benefit of and priority to U.S. Provisional Application No. 62/585,873, filed on Nov. 14, 2017, both of which are incorporated herein by reference in their entirety.

BACKGROUND

The present invention relates generally to mass transfer columns and, more particularly, to mass transfer columns known as dividing wall columns and methods of using the same, such as for the separation of three or more component mixtures.

Mass transfer columns are configured to contact at least two fluid streams in order to provide product streams of specific composition and/or temperature. The term "mass transfer column," as used herein is intended to encompass columns in which mass and/or heat transfer is the primary objective. Some mass transfer columns, such as those utilized in multicomponent distillation and absorption applications, contact a gas-phase stream with a liquid-phase stream, while others, such as extraction columns, may be designed to facilitate contact between two liquid phases of different densities. Oftentimes, mass transfer columns are configured to contact an ascending vapor or liquid stream with a descending liquid stream, usually along or above the surfaces of mass transfer structures that are placed in the interior region of the column to facilitate intimate contact between the two fluid phases. The rate and/or degree of mass and heat transferred between the two phases is enhanced by these mass transfer structures, which may be in the form of various types of trays, structured packing, random packing, or grid packing.

In one type of mass transfer column sometimes referred to as a dividing wall column, one or more vertically-extending dividing walls are positioned within an open internal region within the mass transfer column to allow for separation of a three or more component feedstream within the mass transfer column. As an example, when separating a three component feedstream, a single dividing wall is normally centrally positioned in a middle section of the mass transfer column and extends in a chordal fashion from opposite sides of the mass transfer column. The feedstream is introduced through the shell on one side of the dividing wall and a side draw-off extends through the shell at an opposite side of the dividing wall.

The feedstream is separated into low boiling and heavy boiling fractions on the feed side of the dividing wall, with some of the mid-boiling fraction accompanying the low boiling fraction into an upper section of the mass transfer column and the remainder of the mid-boiling fraction descending with the heavy boiling fraction to a lower section of the mass transfer column. The low boiling fraction is separated from the mid-boiling fraction in the upper section of the mass transfer column and, to a lesser extent, on the draw-off side of the dividing wall and is recovered as the overhead product at the top of the shell. The high boiling fraction is separated from the mid-boiling fraction in the lower section of the mass transfer column, and to a lesser extent, on the thermally-coupled, draw-off side of the dividing wall and is recovered as the bottom product in the sump. The separated mid-boiling fraction is delivered from the upper and lower sections of the mass transfer column to the draw-off side of the dividing wall in the middle section of the mass transfer column and is recovered through the side draw-off. The dividing wall thus allows for the distillation separation of the three component feedstream into three high-purity fractions. Additional dividing walls can be used for the separation of four or more component feedstreams. The dividing wall may also be used in mass transfer columns in which azeotropic, extractive and reactive distillation processes are occurring.

The use of a dividing wall in a mass transfer column is advantageous in that it may eliminate the need for additional mass transfer columns to achieve the same processing that the dividing wall allows to occur in a single mass transfer column, with resulting savings in investment and operating costs. However, a number of design and operational challenges are presented by the use of the dividing wall in the mass transfer columns. One of these challenges involves controlling the split of liquid descending from the upper section of the mass transfer column to the feed side and to the draw-off side of the dividing wall. Various design approaches have been suggested for fixing the split of liquid between the feed and draw-off sides of the dividing wall, but further improvements are needed in the ability to control and adjust the liquid split to provide increased operational flexibility and control of the distillation processes occurring within the mass transfer column.

BRIEF DESCRIPTION OF THE DRAWINGS

In the accompanying drawings that form part of the specification and in which like numbers are used to indicate like components in the various views:

FIG. 8 is a fragmentary perspective view of the mass transfer column and the liquid flow divider shown in FIG. 7, but taken from an opposite side from that shown in FIG. 7 and with portions broken away to show internal details; and FIG. 9 is a fragmentary perspective view of the mass transfer column and liquid flow divider and similar to the view shown in FIG. 8, but shown in a different orientation from that depicted in FIG. 8.

SUMMARY

In one aspect, the invention is directed to a mass transfer assembly for use in an open internal region within a mass transfer column, the mass transfer assembly comprising a dividing wall forming first and second sub-regions on opposite sides of the dividing wall, one or more zones of mass transfer structures positioned in the first and second sub-regions on the opposite sides of the dividing wall, and a liquid flow divider positioned above the dividing wall for delivering a volumetric split of liquid to the first and second sub-regions. The liquid flow divider is moveable between a first configuration for delivering a volumetric flow of liquid to the first sub-region and a second configuration for delivering a greater volumetric flow of liquid to the first sub-region to allow an adjustment of the volumetric split of liquid when delivered to the first and second sub-regions on the opposite sides of the dividing wall. In one embodiment, when the liquid flow divider is in the first configuration the volumetric flow of liquid to the first sub-region is less than or the same as a volumetric flow of liquid to the second sub-region and when the liquid flow divider is in the second configuration the volumetric flow of liquid to the first sub-region is greater than the volumetric flow of liquid to the second sub-region.

In another aspect, the invention is directed to a mass transfer column comprising a shell, an open internal region defined by said shell, and a mass transfer assembly as described above that is positioned within said open internal region.

In a further aspect, the invention is directed to a operating the method of the mass transfer column described above. The method comprises the steps of operating an actuator to move the liquid flow divider between a first configuration for delivering a volumetric flow of liquid to the first sub-region and a second configuration for delivering a greater volumetric flow of liquid to the first sub-region to allow an adjustment of the volumetric split of liquid delivered to the first and second sub-regions on the opposite sides of the dividing wall, introducing a feedstream into the open internal region, processing the feedstream to cause liquid to descend through the first and second sub-regions, and withdrawing a product or products from the mass transfer column.

DETAILED DESCRIPTION

Figure 1:
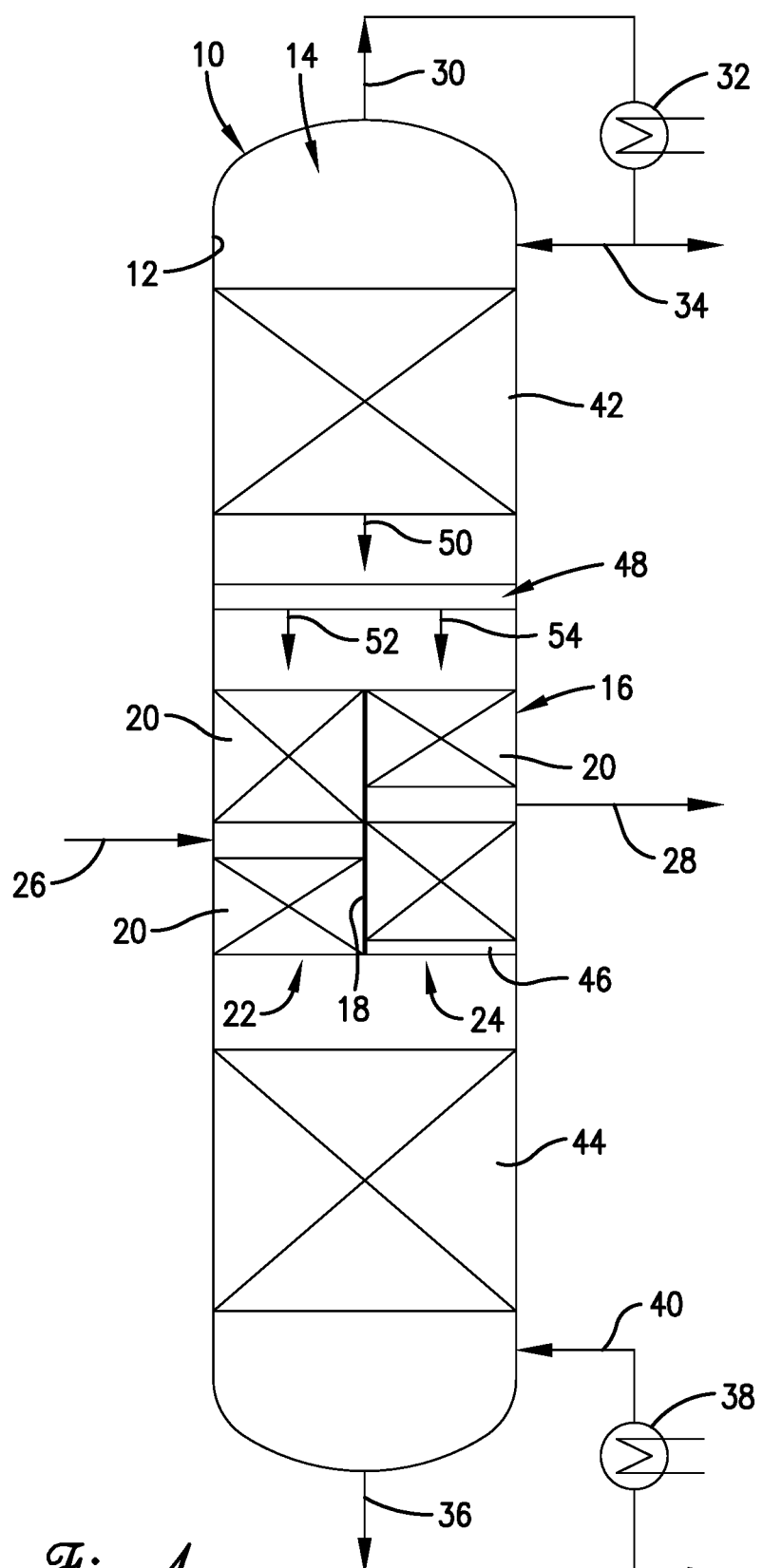
FIG. 1 is a schematic side elevation view of a mass transfer column showing a dividing wall and schematically-represented components positioned within an open internal region within the mass transfer column.

Turning now to the drawings in greater detail and initially to FIG. 1, a mass transfer column suitable for use in mass transfer and heat exchange processes is shown somewhat schematically and is represented generally by the numeral 10. The mass transfer column 10 includes an upright, external shell 12 that is generally cylindrical in configuration, although other configurations, including polygonal, are possible and are within the scope of the present invention. The shell 12 is of any suitable diameter and height and is constructed from one or more rigid materials that are desirably inert to, or are otherwise compatible with, the fluids and conditions present during operation of the mass transfer column 10.

The shell 12 of the mass transfer column 10 defines an open internal region 14 in which the desired mass transfer and/or heat exchange between the fluid streams occurs. A mass transfer assembly 16 comprising one or more dividing walls 18 and one or more zones 20 of mass transfer structures is positioned within the open internal region 14. A single dividing wall 18 is shown in FIG. 1 and it extends in a chordal fashion from one side of the shell 12 to an opposite side of the shell 12. The dividing wall 18 may be formed as a single sheet of material or by joining together individual panels. The dividing wall 18 may be fixed to the shell 12, such as by using bolting bars or by welding, or it may be unfixed and supported by a beam or other structures, including the mass transfer structures.

The dividing wall 18 is shown extending in a vertical plane that intersects a center vertical axis of the shell 12. As shown, the dividing wall 18 bisects the open internal region 14 and forms two sub-regions 22 and 24 on opposite sides of the dividing wall 18 that are of equal cross-sectional area. When the shell 12 is of a cylindrical shape, the sub-regions 22 and 24 on the opposite sides of the dividing wall 18 are of a hemispheric shape. In other embodiments, the dividing wall 18 may be offset from the center vertical axis of the shell 12 so that the regions 22 and 24 on the opposite sides of the dividing wall 18 are of unequal cross-sectional areas. The dividing wall 18 need not extend in a single plane. In some embodiments, the dividing wall 18 may have segments that are in different vertical planes that are interconnected by a sloping segment. In other embodiments, the dividing wall 18 may have spaced-apart segments that are in the same vertical plane and are only partially connected or completely unconnected to each other.

A feedstream 26 is delivered through a nozzle (not shown) in the shell 12 of the mass transfer column 10 into the open internal region 14, such as into the sub-region 22 on one side of the dividing wall 18. The feedstream 26 may be one that contains multiple components that are intended to be separated from each other by processing that occurs within the mass transfer column 10. A side draw-off 28 is removed from the open internal regions 14, such as from the sub-region 24 on the opposite side of the dividing wall 18, through another nozzle (not shown) in the shell 12. The feedstream 26 may be directed radially into the mass transfer column 10. The side draw-off 28 may similarly be removed from the mass transfer column 10 in a radial direction. Other fluid streams may be directed into the mass transfer column 10 through any number of feed nozzles (not shown) positioned at appropriate locations along the height of the mass transfer column 10. Similarly, other side draw-offs may be removed from the mass transfer column 10 through any number of side draw-off nozzles (not shown) positioned at appropriate locations. One or more vapor streams can also be generated within the mass transfer column 10 rather than being introduced into the column 10 through the feed lines.

The mass transfer column 10 also includes an overhead product line 30 at the top of the shell 12 for removing a vapor product or byproduct. A condenser 32 and a reflux return line 34 may be provided in communication with the overhead product line 30 to return a portion of the vapor product or byproduct in liquid form to the mass transfer column 10. A bottom stream takeoff line 36 is provided at the bottom of the shell 12 for removing a liquid product or byproduct from the mass transfer column 10. A reboiler 38 and a vapor return line 40 may be provided to return a portion of the liquid product or byproduct in vapor form to the mass transfer column 10.

The dividing wall 18 may be positioned at various elevations within the open internal region 14 of the mass transfer column 10. The dividing wall 18 is shown in FIG. 1 positioned within a middle section of the mass transfer column 10. In other embodiments, the dividing wall 18 is positioned in an upper section or in a lower section of the mass transfer column 10. The height of the dividing wall 18 and the positioning of the dividing wall 18 can be varied to achieve the process operations designed to occur within the mass transfer column 10.

The number and vertical extent of the zones 20 of the mass transfer structures in the sub-regions 22 and 24 may be varied depending on the type of processes intended to occur within the mass transfer column 10. Other zones, including upper zone 42 and lower zone 44, containing mass transfer structures may be positioned in the upper section and lower section, respectively, of the mass transfer column 10. The mass transfer structures may be in the form of cross-flow or other types of trays or packing. The packing may be structured packing, random packing, and/or grid packing. The mass transfer structures need not be of the same type in all of the zones 20, 42, and 44. For example, some of the zones 20 may be of one type of mass transfer structures, while other ones of the zones 20 are of other types of mass transfer structures. Likewise, the mass transfer structures in the zone 42 need not be the same as the mass transfer structures in the zone 44 or the zones 20. One or more or all of the zones 20, 42, and 44 may additionally include other internals such as liquid collectors, liquid distributors, and grid supports.

At least one of the sub-regions 22 or 24 may optionally include a vapor flow restrictor 46 that is operable to increase or decrease the resistance to vapor flow through the sub-region 22 or 24 with which it is associated so that the resistance to flow becomes greater than or less than the resistance to vapor flow through the sub-region 22 or 24 on the opposite side of the dividing wall 18. The vapor flow restrictor 46 is thus operable to vary the volumetric split of vapor ascending in the open internal region 14 through the sub-regions 22 and 24 on the opposite sides of the dividing wall 18. For example, the vapor flow restrictor 46 can be operated to cause more volumetric flow of vapor through the sub-region 22 than through the sub-region 24, or more volumetric flow through the sub-region 24 than through the sub-region 22. Only one of the vapor flow restrictors 46 is shown in FIG. 1 and it is associated with the sub-region 22 on the feed side of the dividing wall 18. It may alternatively be associated with the sub-region 24 on the draw-off side of the dividing wall 18 or one of the vapor flow restrictors 46 may be associated with sub-region 22 and another one of the vapor flow restrictors 46 may be associated with sub-region 24. While the vapor flow restrictor 46 is shown positioned at a lower end of the sub-region 22, it may alternatively be placed at a top end of the sub-region 22 or at a location between the lower and top ends. The vapor flow restrictor 46 may likewise be placed above, below or within the zones 20 of mass transfer structures. When two or more dividing walls 18 are used, the number of sub-regions formed by dividing walls 18 will normally be one more than the number of dividing walls 18 and the minimum number of vapor flow restrictors 46 will be the same as the number of dividing walls 18.

In one embodiment, the vapor flow restrictor 46 is moveable between a first configuration that causes the vapor flow resistance through the associated sub-region 22 to be less than that through the sub-region 24 on the opposite side of the dividing wall 18 to a second configuration in which the vapor flow restrictor 46 causes the vapor flow resistance through the associated sub-region 22 to be greater than that through the sub-region 24 on the opposite side of the dividing wall 18. In another embodiment, the vapor flow restrictor 46 when in the first configuration causes the vapor flow resistance through the associated sub-region 22 to be generally the same as that through the sub-region 24 on the opposite side of the dividing wall 18 and when in the second configuration causes the vapor flow resistance through the associated sub-region 22 to be greater than that through the sub-region 24 on the opposite side of the dividing wall 18.

The mass transfer assembly 16 includes a liquid flow divider 48 that is positioned above the dividing wall 18 and the zones 20 of mass transfer structures for delivering a volumetric split of liquid to the first and second sub-regions 22 and 24. The liquid flow divider 48 receives liquid that descends from above, as represented by arrow 50. The liquid may descend from the upper zone 42 of mass transfer structures, from a feedstream, or from other sources. In one embodiment, a liquid collector plate (not shown) collects liquid after it has descended through the mass transfer structures in the upper zone 42 and delivers it to the liquid flow divider 48.

The liquid flow divider 48 splits the liquid it receives and delivers a portion of it to the first sub-region 22 and delivers another portion to the second sub-region 24 on the opposite sides of the dividing wall 18, as represented by the arrows 52 and 54, respectively. The liquid flow divider 48 is moveable between a first configuration for delivering a volumetric flow of the liquid to one of the sub-regions 22 or 24 and a second configuration for delivering a greater volumetric flow of liquid to that sub-region 22 or 24 to allow for an adjustment of the volumetric split of liquid delivered to the first and second sub-regions 22 and 24. When the liquid flow divider 48 is in the first configuration the volumetric flow of liquid to the one of the sub-regions 22 or 24 is less than or the same as a volumetric flow of liquid to the other one of the sub-regions 22 or 24 and when the liquid flow divider is in the second configuration the volumetric flow of liquid to the one sub-region 22 or 24 is greater than the volumetric flow of liquid to the other sub-region 22 or 24. The liquid flow divider 48 may regulate liquid flow only to the sub-region 22, only to the sub-region 24, or to both of the sub-regions 22 and 24.

Figure 2:
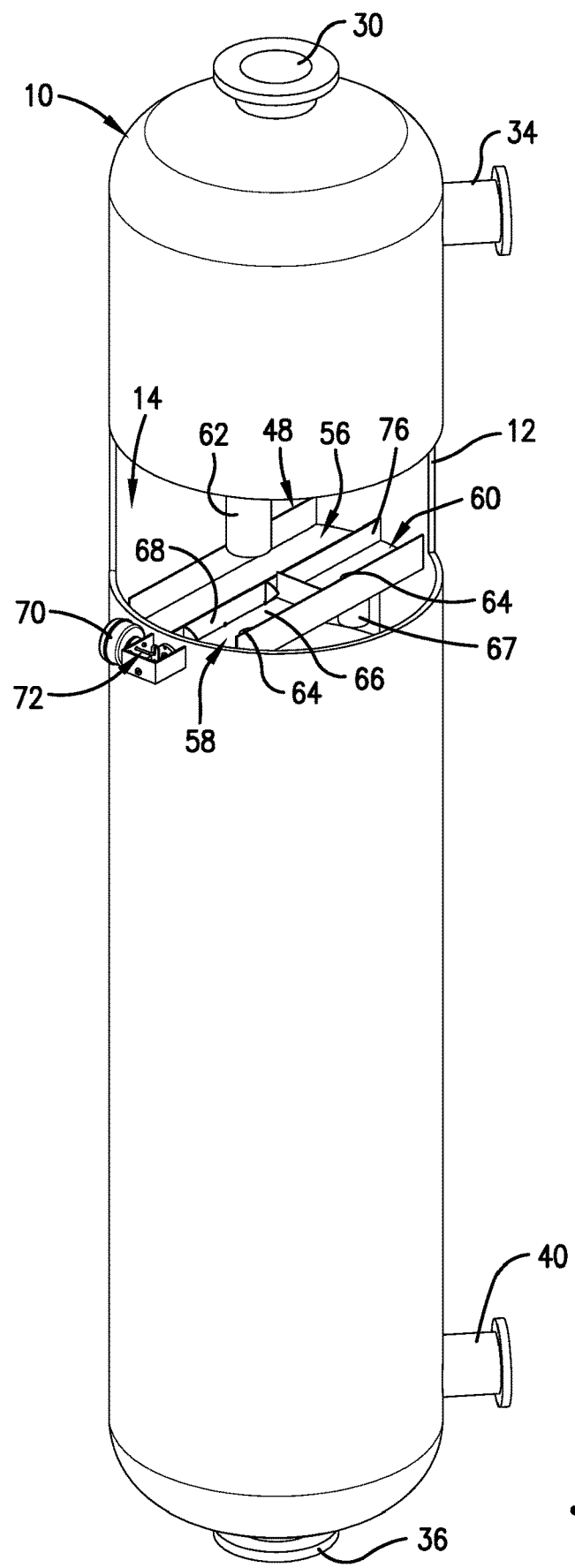
FIG. 2 is a side perspective view of the mass transfer column shown in FIG. 1, with a portion of a shell of the mass transfer column broken away to show one embodiment of the liquid flow divider.
Figure 3:
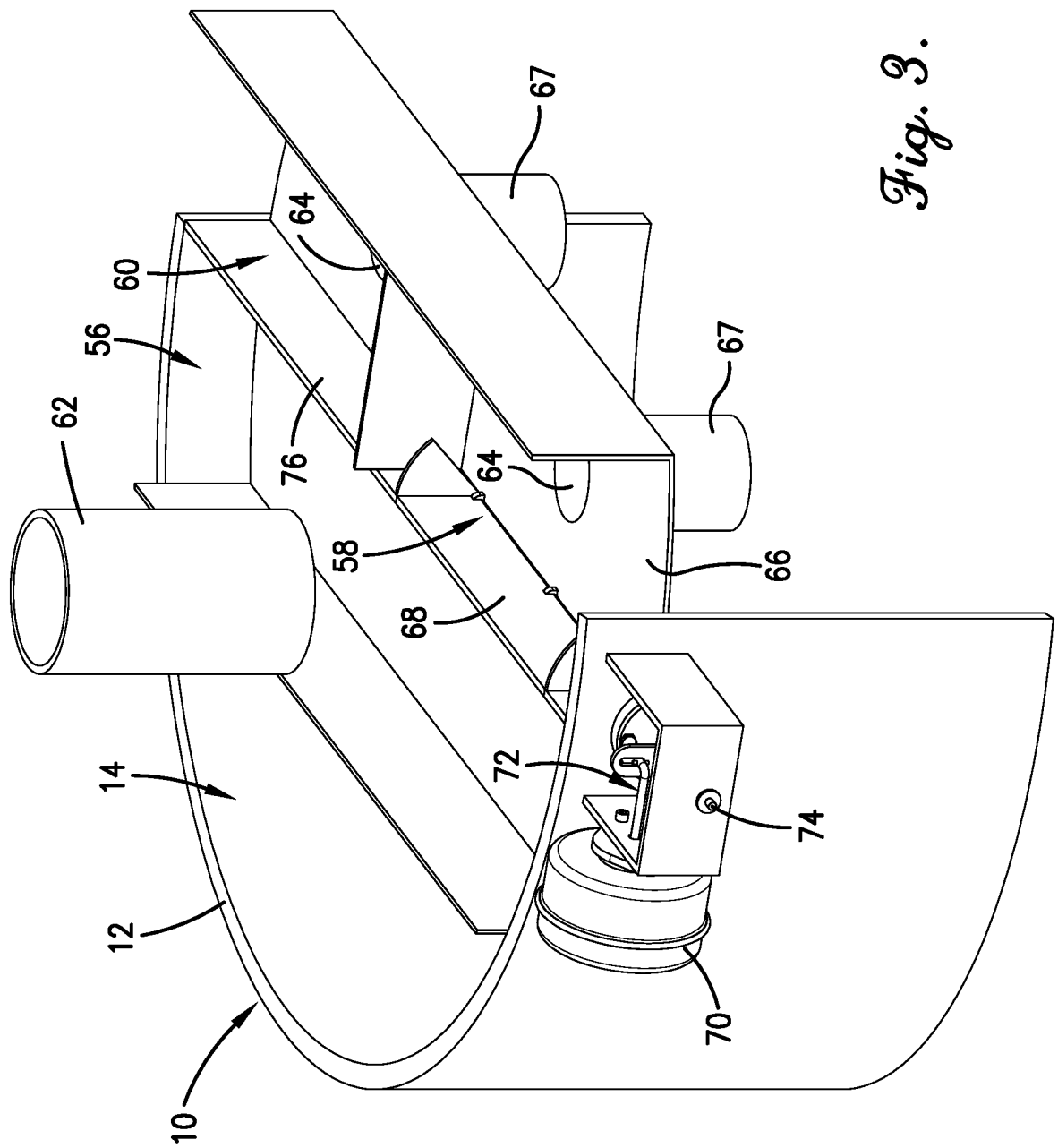
FIG. 3 is a fragmentary top perspective view of the mass transfer column and the liquid flow divider of FIG. 2, and shown on an enlarged scale from that used in FIG. 2.
Figure 4:
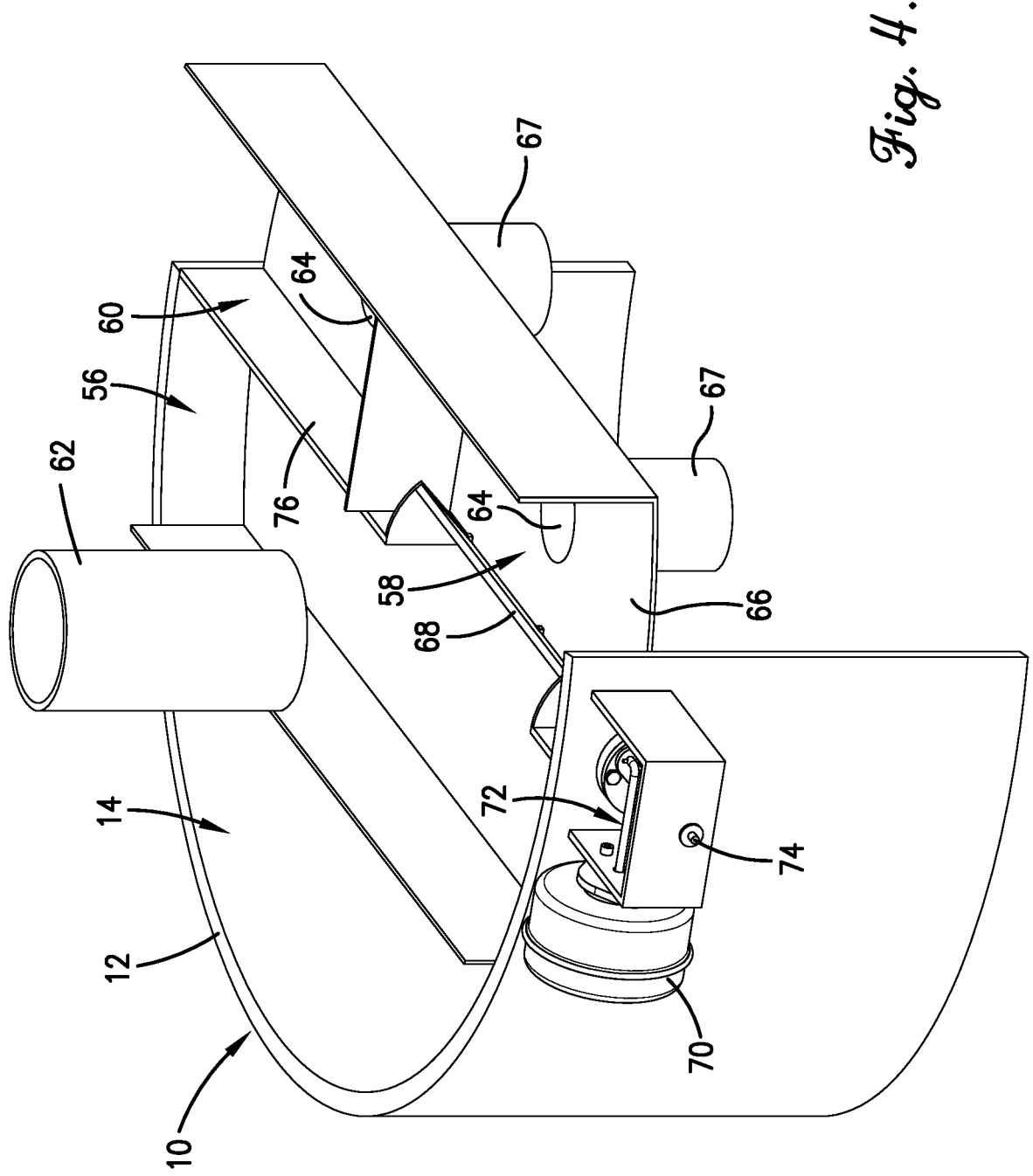
FIG. 4 is a fragmentary top perspective view of the portion of the mass transfer column and the liquid flow divider shown in FIG. 3, but with the liquid flow divider shown in a different orientation from that depicted in FIG. 3.

In the embodiment shown in FIGS. 2-4, the liquid flow divider 48 comprises an inlet box 56 for receiving an inflow of liquid and separate outflow boxes 58 and 60 that are positioned to receive an outflow of liquid from the inlet box 56 and respectively redistribute it as the volumetric flow of liquid 52 to the first sub-region 22 and the volumetric flow of liquid 54 to the second sub-region 24. A conduit 62 directs the inflow of liquid to the inlet box 56. The conduit 62 may receive the liquid from a liquid collector in the upper zone 42 or from another source. The inlet box 56 is generally rectangular in cross-section and extends in a chordal fashion between opposite sides of the shell 12 of the mass transfer column 10. The outflow boxes 58 and 60 may likewise be of rectangular cross-section. The outflow boxes 58 and 60 may be positioned in end-to-end relationship along one side of the inlet box 56. In another embodiment, the outflow boxes 58 and 60 may be positioned along opposite sides of the inlet box 56.

Each outflow box 58 and 60 has an outlet 64 through which liquid exits each outflow box 58 and 60 so that it may be delivered as the volumetric flows of liquid 52 and 54 to the first and second sub-regions 22 and 24. The outlet 64 may be in a floor 66 or a sidewall of the outflow box 58 or 60 and may include one or more conduits 67 for delivering the volumetric flows of liquid 52 and 54 to the desired location, such as a redistributor on opposite sides of the dividing wall 18.

The liquid flow divider 48 includes an outlet weir 68 over and/or through which the outflow of liquid must flow from the inlet box 56 to one of the outflow boxes 58 or 60. The outlet weir is adjustable so that the volumetric flow of liquid from the inlet box 56 to the associated outflow box 58 or 60 may be regulated to thereby control the volumetric split of liquid to the first and second subregions 22 and 24. In one embodiment, the outlet weir 68 is adjustable so that it extends to different heights. When the liquid flow divider 48 is in the first configuration, the moveable outlet weir 68 extends to a first height and when the liquid flow divider 48 is in the second configuration, the moveable outlet weir 68 extends to a second height that is less than the first height. By extending or decreasing the height of the moveable outlet weir 68, the volumetric flow of liquid from the inlet box 56 to the outflow box 58 or 60 with which the outlet weir 68 is associated may be corresponding decreased or increased. Movement of the outlet weir 68 thus acts to control the split of the volumetric flow of liquid into each of the outflow boxes 58 and 60 and from there into the first and second sub-regions 22 and 24. For example, when the moveable outlet weir 68 is at the first height as shown in FIG. 3, roughly equal volumetric flows of liquid flow into the outflow boxes 58 and 60. When the moveable outlet weir 68 is repositioned to the second height as shown in FIG. 4, the split is adjusted and a greater volumetric flow of liquid flows into the outflow box 58 with which the outlet weir 68 is associated than into the other outflow box 60. The ends of the outlet weir 68 are sealed against liquid by-pass.

The liquid flow divider 48 further comprises an actuator 70 associated with the moveable outlet weir 68 for moving it between the first and second heights. The actuator 70 can be of various types, such as a hydraulic actuator, a pneumatic actuator, an electric actuator, a magnetic actuator, and a thermal actuator. The actuator 70 may also include a manual override that allows the actuator 70 to be manually adjustable by an operator or it may be a mechanical actuator that is manually adjustable by the operator. In one embodiment, the moveable outlet weir 68 is pivotally mounted about a pivot axis above or at the floor 66 of the outflow box 58 or 60. The actuator 70 is operably coupled with the moveable outlet weir 68 to cause it to pivot between the first and second heights.

The actuator 70 is operably coupled with the moveable outlet weir 68 by a linkage 72 that translates a movement from the actuator 70 to a movement of the outlet weir 68 about its pivot axis. The actuator 70 is shown mounted exteriorly of the shell 12 of the mass transfer column 10 and the linkage 72 passes through a sealed opening in the shell 12. In one embodiment, the linkage 72 includes a rod 74 that is fixed to the outlet weir 68. The rod 78 is rotated by the actuator 70 and serves as the pivot axis about which the outlet weir 68 rotates. Alternatively, the rod 78 may be connected to a face of the outlet weir 68 to cause the desired movement thereof, such as by linear movement of the rod 78.

When the outlet weir 68 is at its first height, it is rotated to an upright position. When it is at its second height, it is rotated to an inclined orientation either toward the outflow box 58 or 69 or toward the inlet box 56. The outlet weir 68 need not rotate between its first and second heights. For example, it can be mounted so that it can be moved vertically between the first and second heights.

The movement and resulting height adjustment of the outlet weir 68 can be achieved in various ways. In the embodiment shown in FIGS. 2-3, the actuator 70 is a rotary actuator. When the rod 74 is directly connected to the face of the outlet weir 68, the actuator 70 may be a linear actuator. Alternatively, the linkage 74 may comprise a magnetic coupling of the rod 74 or another component of the linkage 72 to the actuator 70. As one example of a suitable magnetic coupling, a drive magnet is attached to and is driven by a shaft of the actuator 70 from a location that is outside of the shell 12. One end of the rod 74 or other component of the linkage 72 is attached to another magnet located within the shell 12 and is rotated by rotation of the drive magnet. This magnetic coupling eliminates the need for the sealed opening in the shell 12.

Another outlet weir 76 may be provided over which the outflow of liquid must flow from the inlet box 56 to the other one of the outflow boxes 58 or 60. The outlet weir 76 may be adjustable in the same or different manner as outlet weir 68 or it may be stationary.

Figure 5:
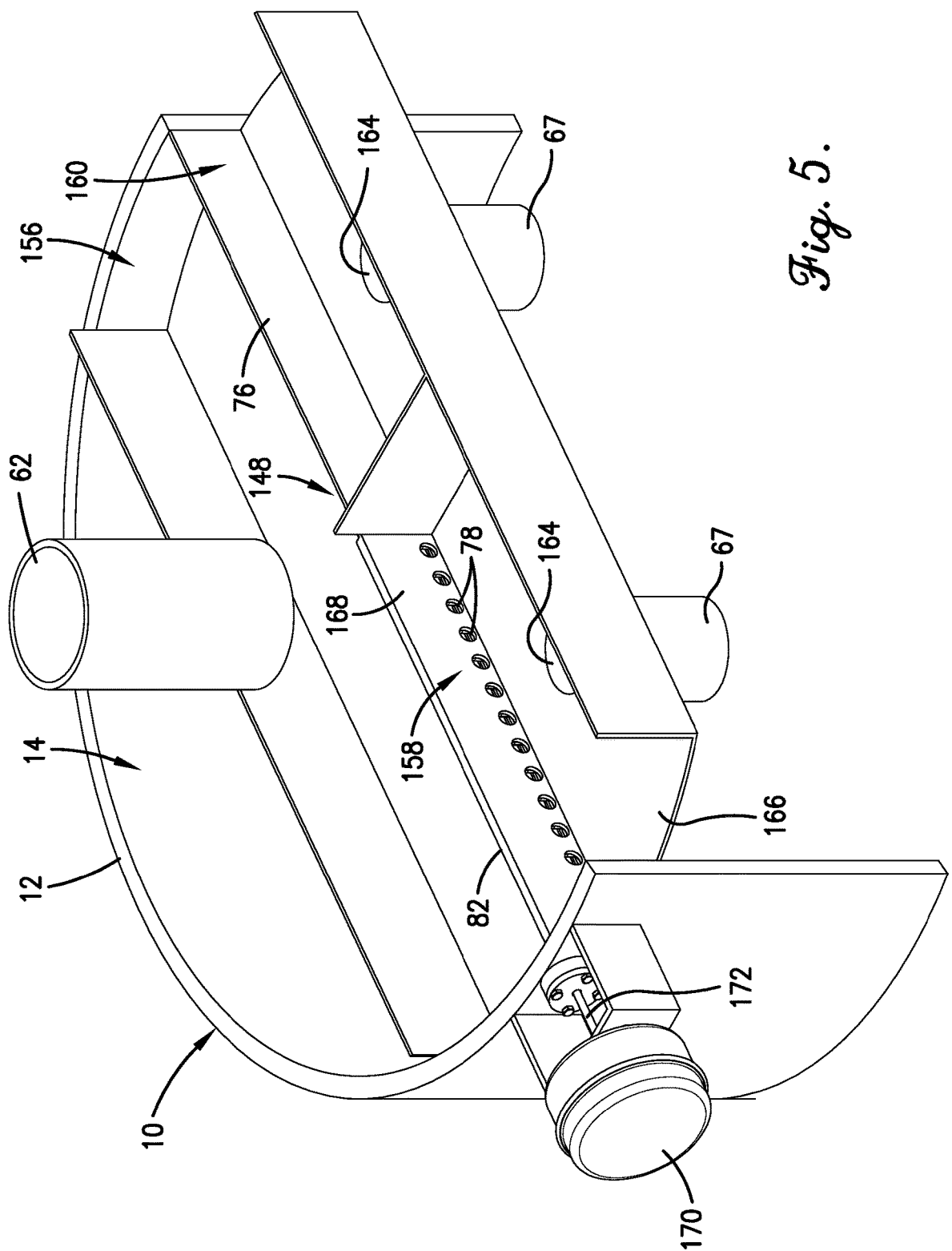
FIG. 5 is a fragmentary top perspective view of a portion of the mass transfer column showing a different embodiment of the liquid flow divider.
Figure 6:
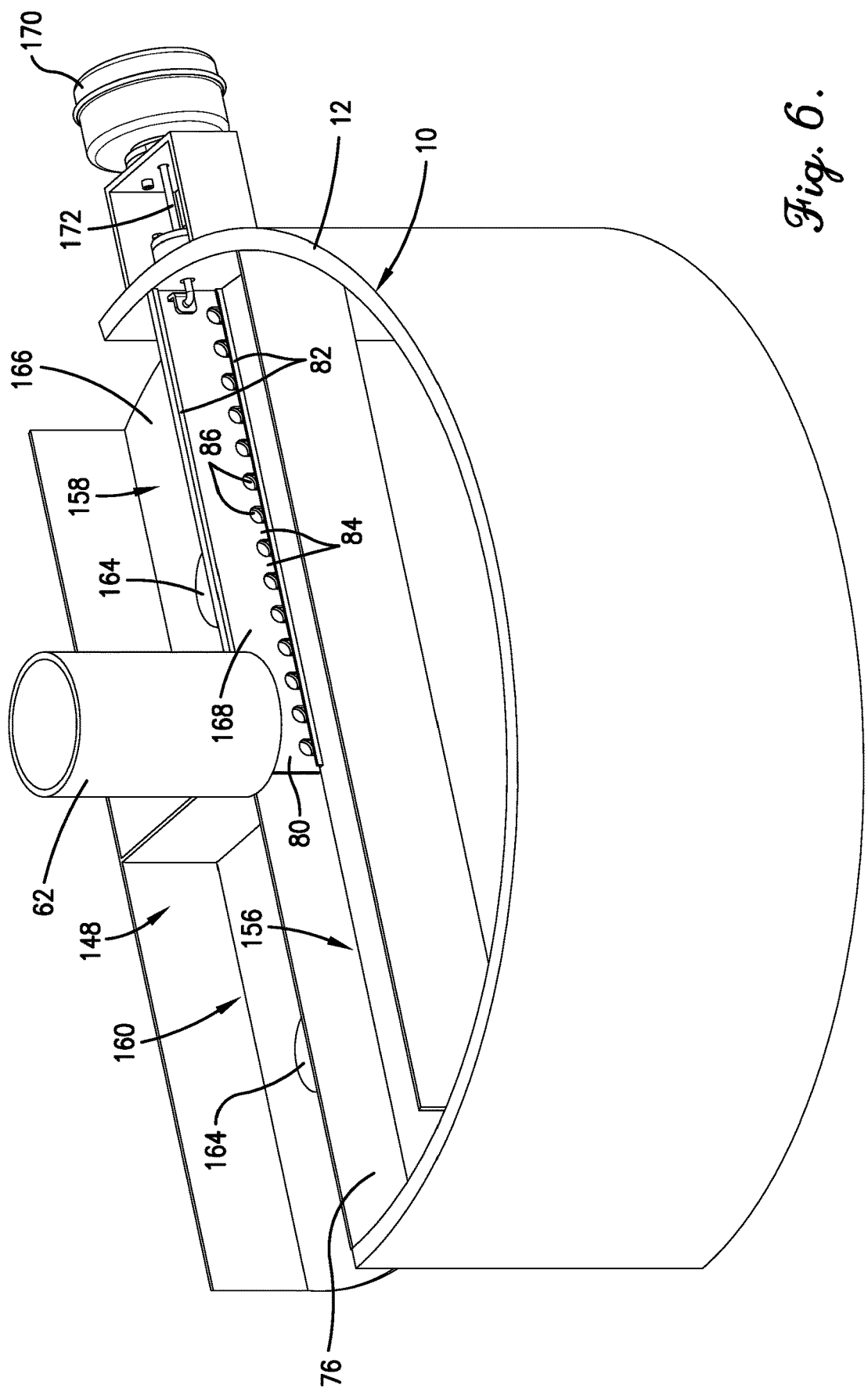
FIG. 6 is a fragmentary top perspective view of the mass transfer column and liquid flow divider shown in FIG. 5, but taken from an opposite side from that shown in FIG. 5.

Another embodiment of the liquid flow divider is shown in FIGS. 5 and 6 and is designated by the numeral 148. Similar parts to those previously described are designated with the same reference numbers preceded by the number "1". The liquid flow divider 148 differs from the previously described liquid flow divider 48 in that the height of outlet weir 168 is not adjustable as in the case of outlet weir 68. Instead, the outlet weir 168 is adjustable between first and second configurations so that differing volumetric quantities of liquid may flow through openings 78 that are provided in the outlet weir 168. By causing a controllable amount of liquid to flow from the inlet box 56 through the outlet weir 168 and into the associated outflow box 158 or 160, the volumetric flow of liquid entering the outflow box 158 or 160 can be increased or decreased. By controlling this volumetric flow, the split of the volumetric flow of into the first and second sub-regions 22 and 24 can be regulated.

The number, size and positioning of the openings 78 in the outlet weir 168 may be varied as desired for particular applications. In one embodiment, the openings 78 are circular and are arranged in a horizontal row near the bottom of the outlet weir 168 and adjacent the floor 166. In other embodiments, the openings 78 may be of other configurations, such as square or rectangular, and can be positioned in other arrangements.

The liquid flow divider 148 includes a restrictor plate 80 that is positioned against the outlet weir 168 and is moveable to control of the volumetric flow of liquid through the openings 78 in the outlet weir 168. In one embodiment, the restrictor plate 80 is positioned against an upstream side of the outlet weir 168 and is supported for sliding movement within support guides 82. The actuator 170 may be connected to the restrictor plate 80 through the linkage 172 to control the sliding movement of the restrictor plate 80. Solid segments 84 of the restrictor plate 80 are moved into covering relationship to a portion or all of the openings 78 in the outlet weir 168 by the sliding movement of the restrictor plate 80. In one embodiment, the segments 84 are constructed to form and surround openings 86 in the restrictor plate 80 that are of the same or similar size and shape as the openings 78 in the outlet weir 168. The openings 86 are positioned in the restrictor plate 80 at locations such that the sliding movement of the restrictor plate 80 brings the openings 86 into and out of alignment with some or all of the openings 78 in the outlet weir 168.

The other outlet weir 176 may be constructed in the same or different manner as outlet weir 68 or 168 or it may be stationary and not adjustable between different configurations. In one embodiment, the outlet weir 176 may be the same height as the outlet weir 168. In another embodiment, the outlet weir 176 may be of a shorter height than outlet weir 168 so that under lower volumetric flow rates, liquid is able to flow over the outlet weir 176 and into its associated outflow box 160 while liquid enters the other outflow box 158 only by flowing through the openings 78 in the adjustable outlet weir 168. At higher flow rates, liquid is able to enter the outflow box 158 both by flowing through the openings 78 in the adjustable outlet weir 168 and by flowing over the adjustable outlet weir 168. It will also be appreciated that other mechanisms may be used to regulate the volumetric flow of liquid through the openings 78 in the outlet weir 168 and remain within the scope of the present invention.

Figure 7:
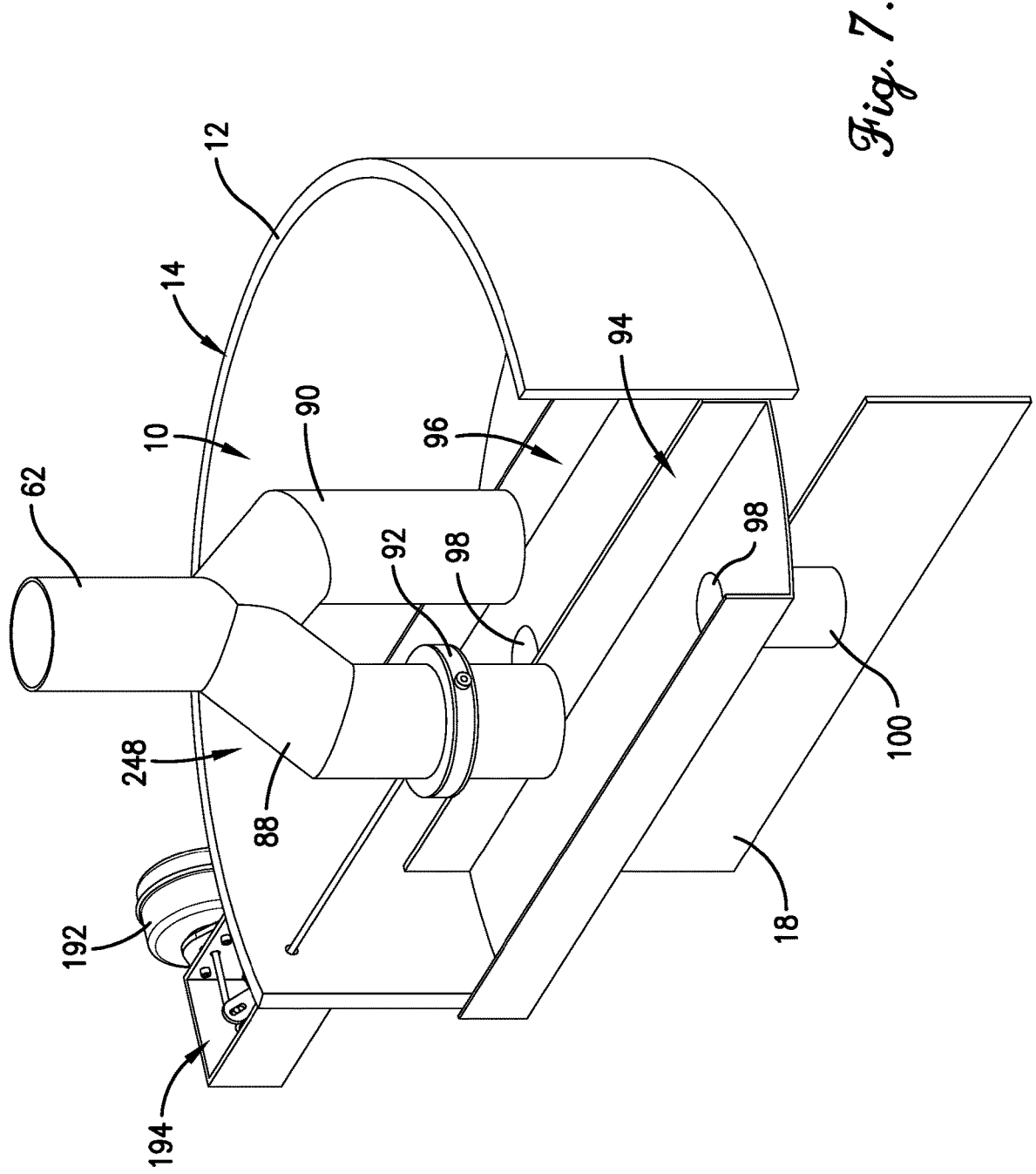
FIG. 7 is a fragmentary perspective view of the mass transfer column showing a different embodiment of the liquid flow divider.

A further embodiment of the liquid flow divider is shown in FIGS. 7-9 and is designated by the numeral 248. The liquid flow divider 248 comprises first and second conduits 88 and 90 through which said volumetric split of liquid is respectively delivered to said first and second sub-regions 22 and 24 and a moveable valve 92 for varying a cross-sectional area that is open to liquid flow within the first conduit 88. When the liquid flow divider 248 is in a first configuration the valve 92 is positioned so that the cross-sectional area that is open to liquid flow through the first conduit 88 is greater than the cross-sectional area that is open to flow when the liquid flow divider is in the second configuration and the valve 92 is repositioned. By increasing or decreasing the open cross-sectional area within the first conduit 88, the volumetric flow of liquid through the first conduit 88 may be corresponding increased or decreased. Movement of the valve 92 may thus act to control the split of the volumetric flow of liquid through each of the first and second conduits 88 and 90 and from there into the first and second sub-regions 22 and 24.

The first and second conduits 88 and 90 may branch from conduit 62 that receives liquid from above. The first and second conduits 88 and 90 may feed liquid into first and second boxes 94 and 96 that may be similar to the outflow boxes 58 and 60 previously described. Outlets 98 from those boxes 94 and 96 feed liquid into the first and second sub-regions 22 and 24, respectively, that are on opposite sides of the dividing wall 18. Conduits 100 and 102 may be associated with those outlets 88.

The liquid flow divider 248 further comprises an actuator 270 associated with the valve 92 for controlling movement of the valve 92. A linkage 272 couples the actuator 270 with the valve 92. The actuator 270 and the linkage 272 may be of the same or similar construction as the actuator 70 and linkage 72 previously described.

The valve 92 may be of various types suitable for varying the open cross-sectional area within the first conduit 88. In one embodiment, the valve 92 includes a rotatable restrictor plate 180 positioned within the first conduit 88 and rotatably coupled by the linkage 272 to the actuator 270. The valve 92 may alternatively be positioned within the second conduit 90 or one of the valves 90 may be positioned in each of the first and the second conduits 88 and 90.

The mass transfer columns described above may be operated in a method that includes the steps of operating the actuator to move the liquid flow divider between a first configuration for delivering a volumetric flow of liquid to the first sub-region and a second configuration for delivering a greater volumetric flow of liquid to the first sub-region to allow an adjustment of the volumetric split of liquid delivered to the first and second sub-regions on the opposite sides of the dividing wall. The method includes introducing a feedstream into the open internal region 16, processing the feedstream to cause liquid to descend through the first and second sub-regions 22 and 24, and withdrawing a product or product from the mass transfer column 10. The feedstream may be one having three or more components and the processing may include separation of the feedstream into high purity components.

From the foregoing, it will be seen that this invention is one well adapted to attain all the ends and objectives hereinabove set forth together with other advantages that are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

The invention claimed is:

1. A mass transfer assembly for use in an open internal region within a mass transfer column, the mass transfer assembly comprising:
   a dividing wall forming first and second sub-regions on opposite sides of the dividing wall;
   one or more zones of mass transfer structures positioned in the first and second sub-regions on the opposite sides of the dividing wall; and
   a liquid flow divider positioned above the dividing wall for delivering a volumetric split of liquid to the first and second sub-regions and moveable between a first configuration for delivering a volumetric flow of liquid to the first sub-region and a second configuration for delivering a greater volumetric flow of liquid to the first sub-region to allow an adjustment of the volumetric split of liquid when delivered to the first and second sub-regions on the opposite sides of the dividing wall,
   wherein the liquid flow divider comprises an inlet box for receiving an inflow of liquid, separate outflow boxes positioned to receive an outflow of liquid from the inlet box and respectively redistribute it as the volumetric flow of liquid to the first sub-region and the volumetric flow of liquid to the second sub-region, and an adjustable outlet weir over and/or through which the outflow of liquid must flow to exit from the inlet box and then enter one of the outflow boxes.

2. The mass transfer assembly of claim 1, wherein when the liquid flow divider is in the first configuration the volumetric flow of liquid to the first sub-region is less than or the same as a volumetric flow of liquid to the second sub-region and when the liquid flow divider is in the second configuration the volumetric flow of liquid to the first sub-region is greater than the volumetric flow of liquid to the second sub-region.

3. The mass transfer assembly of claim 2, wherein when the liquid flow divider is in the first configuration the outlet weir extends to a first height and when the liquid flow divider is in the second configuration the outlet weir extends to a second height that is less than the first height.

4. The mass transfer assembly of claim 3, wherein the liquid flow divider further comprises an actuator and a linkage coupling said actuator with said outlet weir for moving the outlet weir between the first and second heights.

5. The mass transfer assembly of claim 4, wherein the outlet weir is pivotably mounted and said actuator is operably coupled with the outlet weir for causing the outlet weir to pivot between the first and second heights.

6. The mass transfer assembly of claim 2, wherein said liquid flow divider includes openings in the outlet weir through which liquid may flow to exit from the inlet box to then enter the one of the outflow boxes and an adjustable restrictor plate that is moveable to control of the volumetric flow of liquid through the openings in the outlet weir.

7. The mass transfer assembly of claim 2, further including an additional weir over and/or through which the outflow of liquid must flow to exit from the inlet box and then enter another one of the outflow boxes.

8. The mass transfer assembly of claim 7, further including outlets in said outflow boxes for passage of said volumetric flows of liquid.

9. A mass transfer column comprising:
   a shell;
   an open internal region defined by said shell; and
   a mass transfer assembly of claim 1 positioned within said open internal region.

10. The mass transfer column of claim 9, wherein when the liquid flow divider is in the first configuration the volumetric flow of liquid to the first sub-region is less than or the same as a volumetric flow of liquid to the second sub-region and when the liquid flow divider is in the second configuration the volumetric flow of liquid to the first sub-region is greater than the volumetric flow of liquid to the second sub-region.

11. The mass transfer column of claim 10, including an actuator associated with the outlet weir for moving the outlet weir between first and second heights.

12. The mass transfer column of claim 11, wherein when the liquid flow divider is in the first configuration the outlet weir extends to the first height and when the liquid flow divider is in the second configuration the outlet weir extends to the second height, wherein the second height is less than the first height.

13. The mass transfer column of claim 10, wherein said liquid flow divider includes openings in the outlet weir through which liquid may flow to exit from the inlet box to then enter the one of the outflow boxes and an adjustable restrictor plate that is moveable to control of the volumetric flow of liquid through the openings in the outlet weir.

14. The mass transfer column of claim 9, including an additional dividing wall, wherein the dividing walls are positioned in horizontally spaced-apart and parallel relationship to each other.

15. The mass transfer assembly of claim 4, wherein said actuator is selected from a group consisting of a hydraulic actuator, a pneumatic actuator, an electric actuator, a magnetic actuator, and a thermal actuator.

16. The mass transfer assembly of claim 4, wherein said actuator is a rotary actuator or a linear actuator.

17. A mass transfer assembly for use in an open internal region within a mass transfer column, the mass transfer assembly comprising:
   a dividing wall forming first and second sub-regions on opposite sides of the dividing wall;
   one or more zones of mass transfer structures positioned in the first and second sub-regions on the opposite sides of the dividing wall; and
   a liquid flow divider positioned above the dividing wall for delivering a volumetric split of liquid to the first and second sub-regions and moveable between a first configuration for delivering a volumetric flow of liquid to the first sub-region and a second configuration for delivering a greater volumetric flow of liquid to the first sub-region to allow an adjustment of the volumetric split of liquid when delivered to the first and second sub-regions on the opposite sides of the dividing wall,
   wherein the liquid flow divider comprises an inlet box for receiving an inflow of liquid, separate outflow boxes positioned to receive an outflow of liquid from the inlet box and respectively redistribute it as the volumetric flow of liquid to the first sub-region and the volumetric flow of liquid to the second sub-region, and an adjustable outlet weir over and/or through which the outflow of liquid must flow to exit from the inlet box and enter one of the outflow boxes,
   wherein when the liquid flow divider is in the first configuration the outlet weir extends to a first height and when the liquid flow divider is in the second configuration the outlet weir extends to a second height that is less than the first height,
   wherein the liquid flow divider further comprises an actuator and a linkage coupling said actuator with said outlet weir for moving the outlet weir between the first and second heights, and
   outlets in said outflow boxes for passage of said volumetric flows of liquid.

18. The mass transfer assembly of claim 17, wherein said actuator is a rotary or linear actuator selected from a group consisting of a hydraulic actuator, a pneumatic actuator, an electric actuator, a magnetic actuator, and a thermal actuator.

19. The mass transfer assembly of claim 18, wherein the outlet weir is pivotably mounted and said actuator is operably coupled with the outlet weir for causing the outlet weir to pivot between the first and second heights.

20. The mass transfer assembly of claim 19, further including an additional weir over and/or through which the outflow of liquid must flow to exit the inlet box and enter another one of the outflow boxes.

\* \* \* \* \*